United States Patent [19]
Silberkleit et al.

[11] Patent Number: 5,694,303
[45] Date of Patent: Dec. 2, 1997

[54] SEMI-REGULATED POWER SUPPLY USING FORWARD CONVERTER LEAKAGE ENERGY

[75] Inventors: Lee I. Silberkleit, Redmond; David R. Perchlik, Bothell, both of Wash.

[73] Assignee: Interpoint Corporation, Redmond, Wash.

[21] Appl. No.: 554,480

[22] Filed: Nov. 7, 1995

[51] Int. Cl.$^6$ ................................................ H02M 3/335
[52] U.S. Cl. ................................................ 363/20; 363/131
[58] Field of Search .................................. 363/20, 21, 56, 363/95, 97, 131, 132

[56] References Cited

U.S. PATENT DOCUMENTS

| | | | |
|---|---|---|---|
| 4,262,328 | 4/1981 | Bloom et al. | 363/16 |
| 4,318,166 | 3/1982 | Bloom | 363/26 |
| 4,594,649 | 6/1986 | Rhoads et al. | 363/56 |
| 4,709,316 | 11/1987 | Ngo et al. | 363/21 |
| 4,774,649 | 9/1988 | Archer | 363/20 |
| 4,821,163 | 4/1989 | Bloom | 363/49 |
| 4,853,668 | 8/1989 | Bloom | 336/214 |
| 4,864,478 | 9/1989 | Bloom | 363/16 |
| 4,939,427 | 7/1990 | Nilssen | 315/209 R |
| 4,963,795 | 10/1990 | Nilssn | 315/205 |
| 5,017,902 | 5/1991 | Yerman et al. | 336/83 |
| 5,386,359 | 1/1995 | Nochi | 363/21 |
| 5,535,112 | 7/1996 | Vazquez Lopez et al. | 363/20 |

OTHER PUBLICATIONS

Shaughnessy, William J., "Modelling and Design of Non–Dissipative LC Snubber Networks," *Proceedings of Powercon7*, pp. G4–1–G4–9, Nov. 6, 1995.

Domb et al., "Nondissipative Turn–Off Snubber Alleviates Switching Power Dissipation, Second–Breakdown Stress and $V_{CE}$ Overshoot: Analysis, Design Procedure & Experimental Verification," IEEE 0275–9306/82/0000–0445, 1982, pp. 445–454.

M. Burchall, Forced Commutated Power Circuits, Section 40 (MBIM, STC Telecommunications Ltd.) Nov. 6, 1995.

F.F. Mazda, Forced Commutated Power Circuits, Section 42 (MBIM, STC Telecommunication Ltd.) Nov. 6, 1995.

*Primary Examiner*—Adolf Berhane
*Attorney, Agent, or Firm*—Seed and Berry LLP

[57] ABSTRACT

A forward converter circuit transfers a reset current to a capacitor each switching cycle that is independent of the value of input voltage. The reset current stored in a capacitor is transferred to an inductor and, in turn, transferred to a filter capacitor each cycle, thereby providing a semi-regulated voltage to a constant resistive load.

14 Claims, 4 Drawing Sheets

1

SEMI-REGULATED POWER SUPPLY USING FORWARD CONVERTER LEAKAGE ENERGY

DESCRIPTION

1. Technical Field

This invention relates to power supplies, and more particularly, to a DC/DC forward converter in which a regulated voltage is needed for either the forward converter or another device.

2. Background of the Invention

Power supplies are commonly used to provide DC power for electronic devices from either AC power or DC power at a different voltage. DC power supplies that receive DC power at a different voltage are sometimes known as power converters.

There are a wide variety of power converters in existence. Power converters generally apply the DC input power to a switch circuit which is controlled to maintain the output voltage or current at a predetermined value. One of the advantages of using switches to convert the DC input voltage to a DC output voltage is that switches dissipate relatively little power because they are either closed or open. Many power converters also use a transformer having a primary winding connected in series with a switch.

A commonly used power converter circuit periodically switches a voltage across the primary winding of a transformer using a switch connected in series with the primary winding. The periodically applied voltage causes an AC voltage to be generated across the secondary winding that is rectified, filtered and applied to the output of the power converter. A power transformer used in this type of converter must be "reset" each cycle because the voltage applied to the primary of the transformer is not symmetrical. When the switch is closed, the current in the primary of the transformer linearly increases as a result of the inductance of the primary winding. When the switch is opened, the magnetic field that has been generated in the transformer dissipates thereby generating a substantial reverse voltage across the primary winding of the transformer. Power can be dissipated in the transformer because of the resistance of the transformer primary and secondary as well as leakage inductances in the transformer. It is important to minimize the power dissipated in a power converter in order to maximize the efficiency of the converter and minimize the amount of heat that must be removed from the converter. This period during which the magnetic field in the transformer dissipates is known as a transformer reset. The voltage generated across the primary of the transformer during transformer reset is sometimes dissipated in the transformer and switching circuitry connected to the transformer. However, dissipating the reset energy in this manner wastes power, thereby reducing the efficiency of the power converter. As a result, circuits known as "reset snubbers" have been developed for forward converters to couple this reset voltage back to the input of the power converter so that it is not wasted. Reset snubbers have greatly improved the efficiency of forward converters.

At least some of the circuitry used in conventional forward converters must receive a regulated DC voltage in order to operate. In the past, this regulated DC voltage was often supplied by a power supply circuit contained in either the forward converter itself or in a separate unit. The expense of a regulated power supply to provide a regulated voltage for forward converters and other circuitry can constitute a significant portion of the expense of such forward converters and other circuitry.

SUMMARY OF THE INVENTION

The inventive forward converter uses the reset energy that is normally either dissipated or returned to the input of the forward converter to instead provide a semi-regulated voltage. The forward converter includes a transformer having a primary winding connected in series with a selectively closing first switch between a pair of input terminals to which an input voltage is applied. The series combination of a capacitor and a second switch is connected between the junction of primary winding and the first switch and a voltage that varies according to the magnitude of the input voltage. When the first switch periodically opens, the primary winding generates a reset current that is coupled to the capacitor through the second switch. The second switch closes when the voltage on a lead of the capacitor has a predetermined magnitude with respect to the input voltage so that a charge is transferred to the capacitor each operating cycle, and the magnitude of the charge is independent of the magnitude of the input voltage. An energy transferring circuit coupled to the capacitor receives a portion of the energy stored in the capacitor during each operating cycle and transfers the energy to a pair of output terminals.

The energy transferring circuit preferably includes an inductor and a third switch connected in series with the inductor between a fixed voltage and a lead of the capacitor. The third switch closes during at least a portion of the period that the first switch is closed so that the energy stored in the capacitor is transferred to the inductor. A second energy transferring circuit coupled to the inductor receives a portion of the energy transferred to the inductor during each operating cycle and transfers the energy to the output terminals.

DETAILED DESCRIPTION OF THE INVENTION

Figure 1:
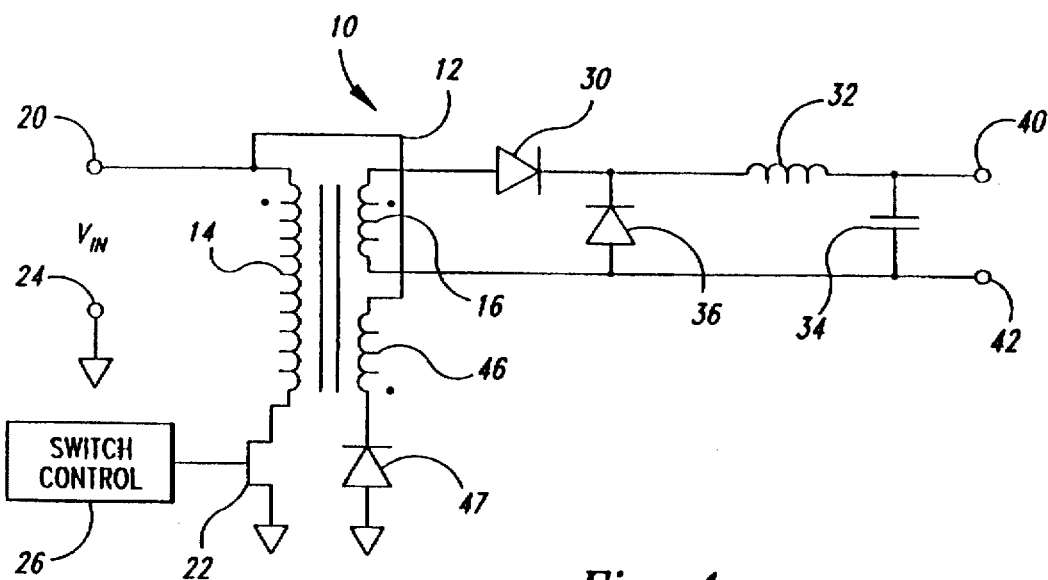
FIG. 1 is a schematic of a conventional forward converter having reset snubber circuitry for coupling reset energy to the input of the converter.

A conventional forward converter 10 with a transformer reset snubber is illustrated in FIG. 1. The forward converter 10 includes a transformer 12 having a primary winding 14 and a secondary winding 16. The primary winding 14 is connected between a first input terminal 20 and the drain of a MOSFET transistor 22. The source of the MOSFET transistor 22 is connected to ground, as is the other input terminal 24. The gate of the MOSFET transistor 22 is connected to a conventional switch control circuit 26. The switch control circuit 26 periodically applies a positive pulse to the gate of the MOSFET transistor 22 to cause the MOSFET transistor 22 to periodically connect the input terminals 22, 24 across the primary winding 14 of the transformer 12. The MOSFET transistor 22 thus essentially functions as a periodically closing switch.

When the MOSFET transistor 22 conducts, current is drawn from the input terminal 20 through the primary winding 14 of the transformer 14 to ground, and back to input terminal 24. During this time, the input voltage $V_{IN}$ is applied across the primary winding 14 of the transformer 12. As a result, a voltage is generated across the secondary winding 16 of the transformer 12 that is substantially equal to the product of N and $V_{IN}$, where N is the turns ratio of the transformer 12. The voltage generated across the secondary winding 16 is coupled through a first rectifying diode 30 to an inductor 32 which, with capacitor 34, acts as a filter. A relatively steady state DC voltage is then generated across the output terminals 40, 42. A second diode 36 provides a path from the inductor 32 to the capacitor 34 and output terminal 40 for the output current during the period when the MOSFET transistor 22 opens, as explained below.

When the switch control 26 causes the MOSFET transistor 22 to open, the transformer 12 resets during which time the magnetic field in the transformer 12 dissipates and a reverse polarity voltage is generated across a secondary winding 46 of the transformer 12. One end of the secondary winding 46 is connected to ground through a diode 47 and the other end of the secondary winding is feedback to the first input terminal 20. As a result, as the magnetic field in the secondary winding 46 dissipates, current is coupled back to the input terminal 20.

Figure 2:
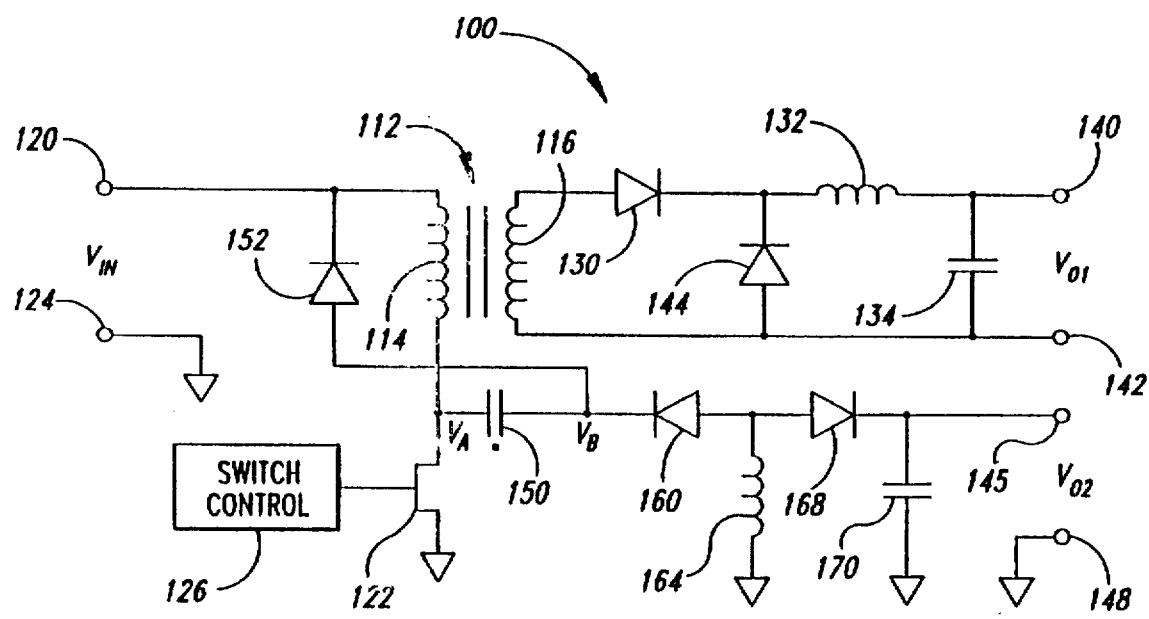
FIG. 2 is a schematic of the preferred embodiment of the inventive forward converter having a semi-regulated power supply using the forward converter reset energy.

A preferred embodiment of the inventive forward converter circuit is illustrated in FIG. 2. The forward converter 100 primarily functions to convert an input voltage $V_{IN}$ to a first output voltage $V_{O1}$ at a different voltage, and it also uses reset energy to generate a second, semi-regulated output voltage $V_{O2}$. As in the forward converter 10 of FIG. 1, the preferred embodiment oft he inventive forward converter 100 includes a transformer 112 having a primary winding 114 and a secondary winding 116. The primary winding 114 is connected in series with an input terminal 120, a MOSFET transistor 122, and ground. Another input terminal 124 is also connected to ground. The MOSFET transistor 122 is periodically turned on by a conventional switch control circuit 126.

The secondary winding 116 of the transformer 112 is connected to output terminals 140, 142 through a diode 130 and inductor 132. A filter capacitor 134 is connected across the output terminals 140, 142. Finally, a diode 144 provides a path for current flowing in the output inductor L132 during the MOSFET 122 OFF time. The components 130–146 connected to the secondary winding 116 of the transformer 112 operate in the same manner as the components 30–44 connected to the secondary winding 16 of the transformer 12 of FIG. 1. In the interest of brevity, the operation of these components will not be described further.

The forward converter 100 also includes a number of components connected to the primary winding 114 that function to convert the reset energy of the transformer 112 to a semi-regulated voltage delivered to output terminals 146, 148. The operation of the circuit containing these components will be described in connection with each of its operating states.

The forward converter 100 illustrated in FIG. 2 undergoes several distinct states during its operation. The first state, which will be referred to herein as "State 1," starts when the MOSFET transistor 122 becomes nonconductive, thus terminating the flow of current through the primary winding 114 of the transformer 112. A second state, referred to herein as "State 2," starts when the MOSFET transistor 122 becomes conductive, thus starting the flow of current through the primary winding 114. A final state, referred to herein as "State 3," occurs during the time that the MOSFET transistor is conductive some time after the start of State 2.

Figure 3:
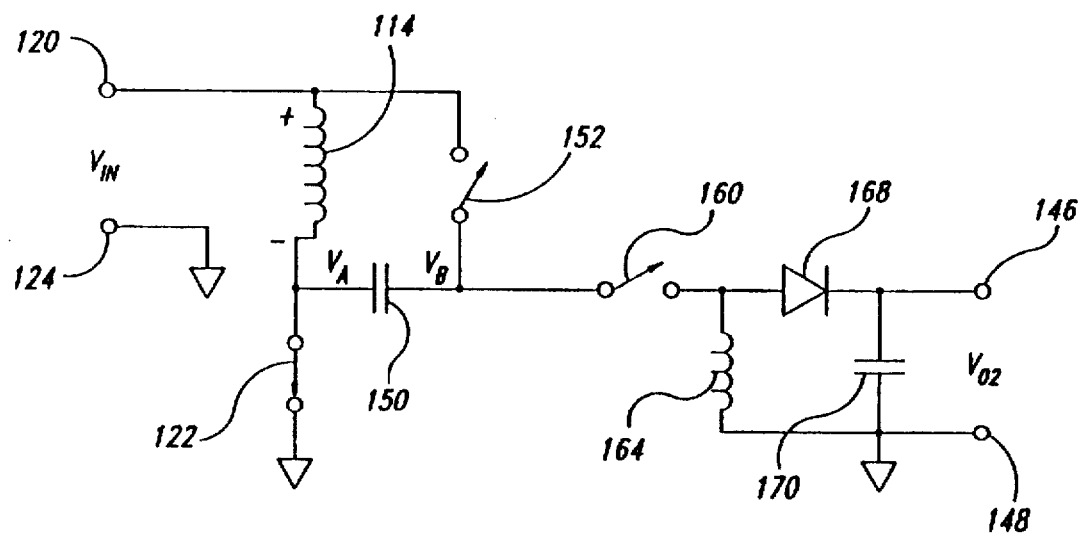
FIG. 3 is a schematic showing the effective configuration of the forward converter of FIG. 2 just prior to the first of three operating states.

Prior to the start of State I1 the forward converter 100 assumes the operating configuration shown in FIG. 3. (The secondary winding 116 and the components connected thereto have been eliminated for purposes of clarity.) The voltage $V_A$ is at ground since the MOSFET switch 122 is closed, and the voltage $V_b$ will be assumed to be slightly less than $V_{O2}$ so that the diode 160 is back biased. Also, because $V_{O2}$ is assumed to be less than $V_{IN}$, and $V_B$ is slightly below $V_{O2}$, the diode 152 is back biased. Since the MOSFET switch 122 has been closed for some time, the current flowing through the primary winding 114 has built up to a substantial level.

Figure 4:
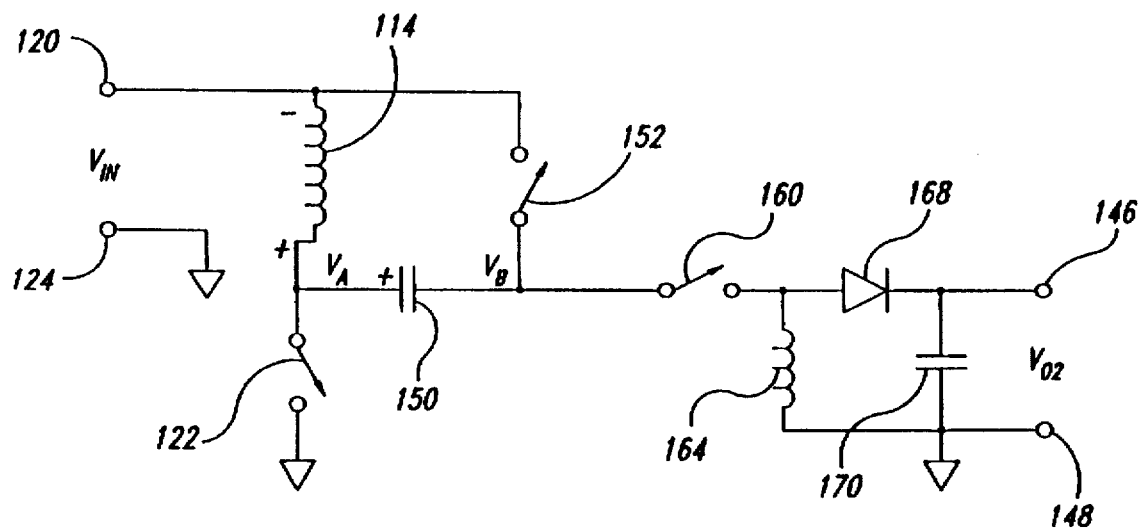
FIG. 4 is a schematic showing the effective configuration of the forward converter of FIG. 2 during the early portion and the later portion of the first of three operating states.

At the start of State 1, the MOSFET switch 122 opens, and the reset of the transformer 112 causes a voltage to be generated across the primary winding 114. The forward converter 100 then assumes the operating configuration shown in FIG. 4, and the voltages $V_A$ and $V_B$ are shown as a function of time in FIG. 5. State 1 starts at $t_1$ when the MOSFET switch 122 is opened. The reset current flowing from the lower end of the primary winding 114 quickly increases the voltage $V_A$, thereby causing a corresponding increase in the voltage $V_B$, since the diode 152 is initially back biased, thereby leaving the node on which $V_B$ is measured floating. However, when $V_B$ rises to $V_{IN}$, the diode 152 becomes forward biased, so that the forward converter 100 assumes the configuration shown in FIG. 6.

Figure 5:
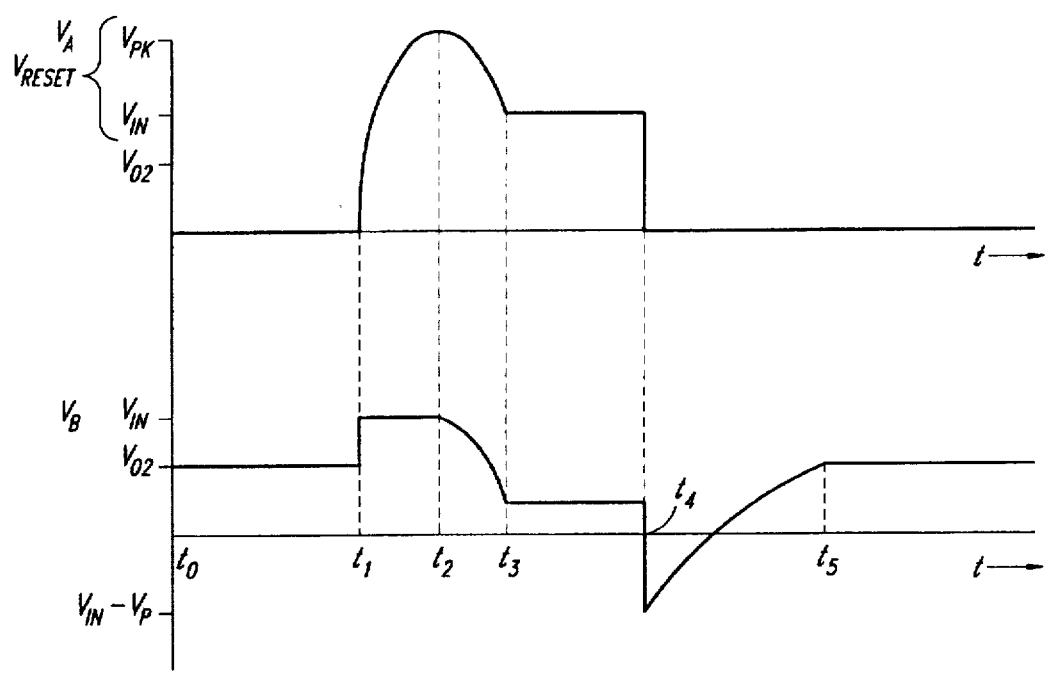
FIG. 5 is a waveform diagram showing time varying voltages present in the forward converter of FIG. 2.
Figure 6:
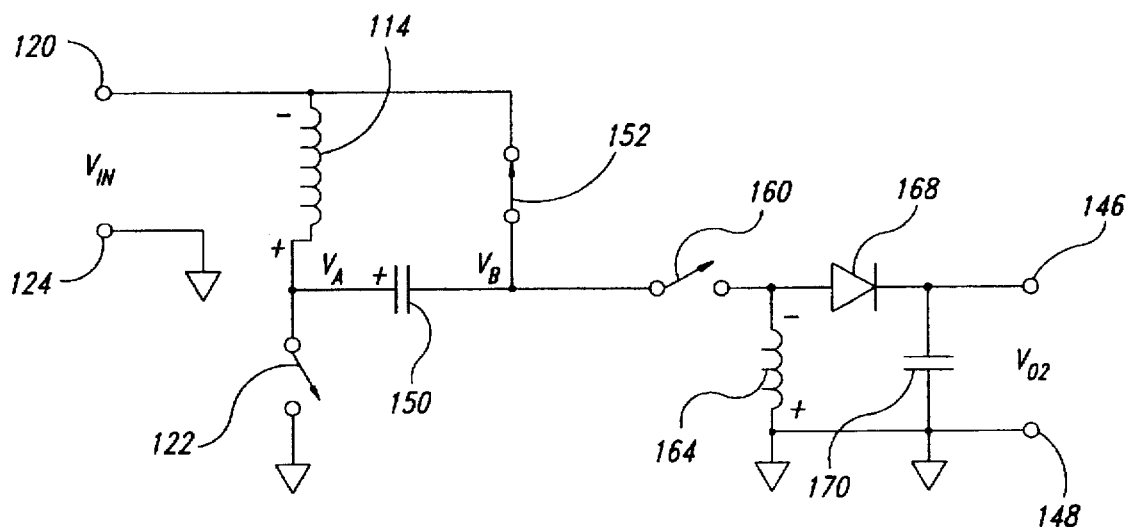
FIG. 6 is a schematic showing the effective configuration of the forward converter of FIG. 2 during a mid-portion of the first of three operating states.

As shown in FIG. 6, $V_B$ is clamped at $V_{IN}$ as illustrated in FIG. 5 while $V_A$ continues to rise as the capacitor 150 is charged by the reset current from the primary winding 114 of the transformer 112. Note that the diode 152, is represented as a short circuit in its forward biased condition, thus ignoring the forward biased diode drop. Also, since $V_b$ is now greater than $V_{O2}$ (as shown in FIG. 5), the diode 160 is back-biased, as illustrated in FIG. 6. At time $t_2$, as illustrated in FIG. 5, the voltage $V_A$ has reached a peak voltage $V_{PK}$. The voltage $V_A$ reaches the peak voltage $V_{PK}$ when the magnetic field in the transformer 112 has dissipated and the flow of reset current into the capacitor 150 terminates. The magnitude of $V_{PK}$ is proportional to the magnitude of $V_{IN}$ as well as the duration that the MOSFET switch 122 was closed prior to State 1. The input voltage $V_{IN}$ may change appreciably but the duty cycle of the MOSFET switch 122 varies inversely with the magnitude of $V_{IN}$ to maintain the energy stored in the primary magnetizing inductance of the transformer 112 fairly constant. However, the magnitude of $V_{PK}$ varies directly with the magnitude of $V_{IN}$ and does not vary with either the duty cycle or the magnitude of the load connected to the forward converter 100. After $t_2$, $V_A$ will return to $V_{IN}$ at a rate determined by the transformer inductance and parasitic capacitance of the converter. The decrease in voltage $V_A$ is coupled through the capacitor 150 to $V_B$, thereby causing $V_B$ to drop below the voltage $V_{IN}$ to which it had been clamped by the diode 152. Since the voltage $V_B$ is now less than $V_{IN}$, the diode 152 opens, thereby once again isolating the node on which $V_B$ is measured and returning the effective configuration of the forward converter to that illustrated in FIG. 4. As a result, $V_B$ follows the decrease of $V_A$, and the voltage across the capacitor 150 remains constant at $V_{RESET}$, where $V_{RESET}$ is equal to the difference between $V_{PK}$ and $V_{IN}$. At time $t_3$, the voltage $V_A$ has fallen to $V_{IN}$, and the voltages $V_A$ and $V_B$ remain stable for the remainder of State 1.

It is significant that, at the end of State 1, the charge on capacitor 150 is constant regardless of the magnitude of $V_{IN}$. The charge on the capacitor 150 is directly proportional to the energy stored in the magnetizing inductance L of the primary winding 114. The energy stored in each cycle in the magnetizing inductance is $$\frac{V_{IN}*(t_1 - t_0)}{L}.$$

Since the switch control insures that $V_{IN}$ is inversely proportional to $V_1-V_0$, the energy stored is constant, thus the energy stored in capacitor 150 will be constant as the magnitude of $V_{IN}$ varies. It is this aspect of the preferred embodiment of the forward converter 100 that provides a semi-regulated output voltage $V_{O2}$, as explained in greater detail below.

Figure 7:
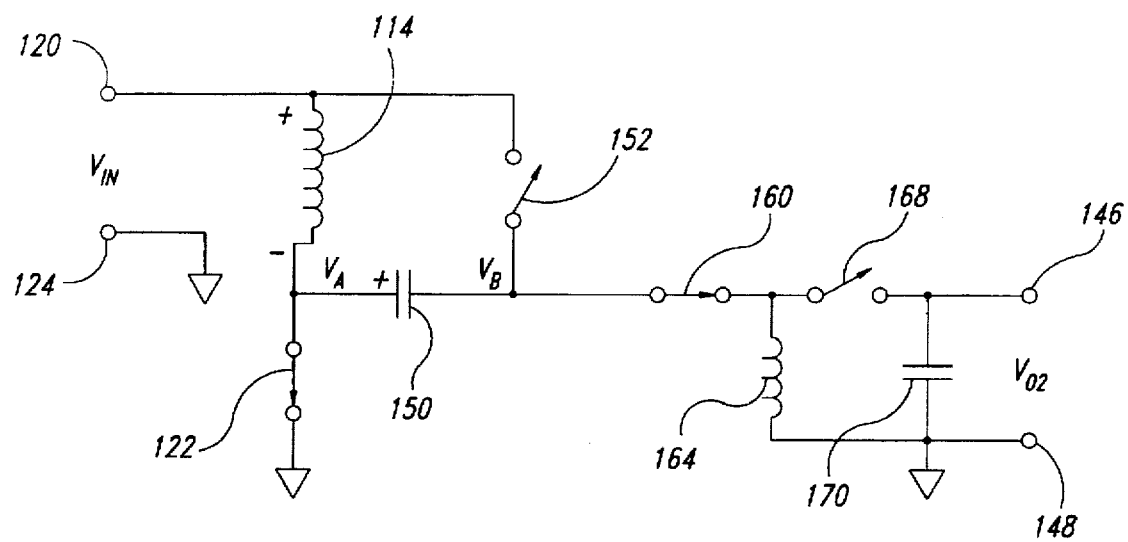
FIG. 7 is a schematic showing the effective configuration of the forward converter of FIG. 2 in the second of three operating states.

The MOSFET switch 122 closes at time h which constitutes the start of State 2. In State 2, the forward converter 100 assumes the configuration shown in FIG. 7. As illustrated in FIG. 5, the voltage $V_A$ on capacitor 150 is switched from $V_{IN}$ to 0 volts, thereby dropping $V_B$ by $V_{IN}$. Since $V_B$ just prior to $t_4$ was at $2 V_{IN}-V_{PK}$, the voltage $V_B$ just after $t_4$ drops to $V_{IN}-V_{PK}$. Thereafter, the capacitor 150 forms a series resonant circuit with the inductor 164 since the diode 160 is forward biased by the negative voltage $V_B$. As a result, the voltage $V_B$ increases after $t_4$ as shown in FIG. 5.

Figure 8:
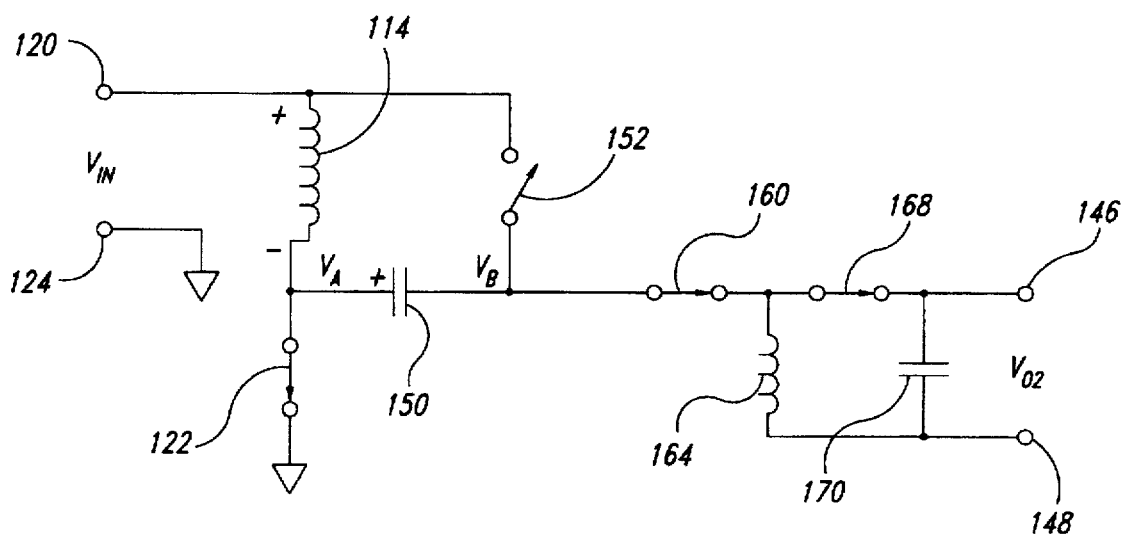
FIG. 8 is a schematic showing the effective configuration of the forward converter of FIG. 2 in the third of three operating states.

When the voltage $V_A$ reaches $V_{O2}$, the diode 168 becomes forward biased so that the forward converter 100 assumes the configuration shown in FIG. 8. Thereafter, capacitor 150 is essentially placed in parallel with capacitor 170. However, since the capacitance of capacitor 170 is preferably significantly greater than the capacitance of capacitor 150, most of the current flowing from the inductor 164 as the magnetic field in the inductor 164 collapses flows into the capacitor 170. Capacitor 170 is sufficiently large that the voltage across capacitor 170 remains substantially constant at $V_{O2}$ as current from the inductor 164 flows into the capacitor 170. Thus, the voltage across the capacitor 150 changes from $V_{PK}-V_{IN}$ at time $t_4$ to $-V_{O2}$ at a time prior to $t_1$ of the next cycle. The change in energy stored in the capacitor 150 thus changes from $\frac{1}{2}C(V_{PK}-V_{IN})^2$ at $T_4$ to $-\frac{1}{2}CV_{O2}^2$ just prior to $t_1$ of the next cycle, where C is the capacitance of capacitor 150. The difference in energy stored in the capacitor from $t_4$ to $t_1$, i.e., $\frac{1}{2}C[(V_{PK}-V_{IN})^2-V_{O2}^2]$ is the amount of energy transferred to the capacitor 170 each energy transfer cycle. As explained above, the amount of charge transferred to the capacitor 170 cycle remains constant. For a constant power load, the voltage $V_{O2}$ will therefore remain constant.

In summary, by placing a charge on capacitor 150 each cycle that is independent of the voltage $V_{IN}$, the voltage resulting from that energy transfer is constant for a constant power load. Although the preferred embodiment of the forward converter 100 illustrated in FIG. 2 utilizes an inductor 164 and capacitor 170 as a vehicle for transferring energy from the capacitor 150, other configurations may be used. For example, instead of using an inductor 164, capacitor 170 and diode 168, the primary of a transformer may be used in place of the inductor 164 so that energy from the capacitor 150 is transferred by transformer coupling. Also, the capacitor 150 may be connected to the transformer 112 in other configurations as long as the energy transferred to the capacitor 150 is independent of the magnitude of the input voltage $V_{IN}$. Other alternatives for transferring energy from the capacitor 150 each cycle will be apparent to one skilled in the art. Thus, it will also be evident that, although specific embodiments of the invention have been described herein for purposes of illustration, various modifications may be made without deviating from the spirit and scope of the invention.

We claim:

1. In a forward converter for converting DC power at a first voltage applied between first and second input terminals to DC power at a second voltage applied to a first pair of output terminals, said forward converter having a transformer with a primary winding connected in series with a selectively closing first switch between said input terminals, said first switch closing during a portion of each of a plurality of operating cycles, a circuit for generating semi-regulated DC voltage at a second pair of output terminals, comprising:

a capacitor having first and second leads;

a second switch connected in series with said capacitor between the junction of said primary winding and said first switch and a voltage that varies according to the magnitude of said first voltage, said second switch being closed during at least a portion of the time when said first switch is open and when the voltage on a lead of said capacitor has a predetermined magnitude with respect to said first voltage causing a charge to be transferred to said capacitor each operating cycle having a magnitude that is independent of the magnitude of said first voltage; and a first energy transferring circuit coupled to said capacitor, said energy transferring circuit receiving a portion of the energy stored in said capacitor during each operating cycle and transferring said energy to said second pair of output terminals.

2. The forward converter of claim 1 wherein the first terminal of said primary winding is connected to said first input terminal, the second terminal of said primary winding is connected to said first switch, and said first switch is connected between the second terminal of said primary winding and said second input terminal, and wherein the series combination of said capacitor and said second switch is connected between the first and second terminals of said primary winding.

3. The forward converter of claim 2 wherein said second switch is connected to the first terminal of said primary winding and said capacitor is connected to the second terminal of said primary winding.

4. The forward converter of claim 3 wherein said second switch is a diode.

5. The forward converter of claim 1 wherein the first terminal of said primary winding is connected to said first input terminal, the second terminal of said primary winding is connected to said first switch, and said first switch is connected between the second terminal of said primary winding and said second input terminal, and wherein said second switch is a diode.

6. The forward converter of claim 1 wherein said energy transferring circuit comprises:

an inductor;

a third switch connected in series with said inductor between a fixed voltage and the second lead of said capacitor, said third switch closing during at least a portion of the period that said first switch is closed so that the energy stored in said capacitor is transferred to said inductor; and a second energy transferring circuit coupled to said inductor, said energy transferring circuit receiving a portion of the energy transferred to said inductor during each operating cycle and transferring said energy to said second pair of output terminals.

7. The forward converter of claim 1 wherein said energy transferring circuit comprises:

an inductor;

a diode connected in series with said inductor between a fixed voltage and the second lead of said capacitor, said diode allowing energy stored in said capacitor to be transferred to said inductor; and a second energy transferring circuit coupled to said inductor, said energy transferring circuit receiving a portion of the energy transferred to said inductor during each operating cycle and transferring said energy to said second pair of output terminals.

8. The forward converter of claim 1 wherein said energy transferring circuit comprises:

an inductor;

a third switch connected in series with said inductor between a fixed voltage and the second lead of said capacitor, said third switch closing during at least a portion of the period that said first switch is closed to transfer the energy stored in said capacitor to said inductor;

a second capacitor connected between said second pair of output terminals; and a fourth switch connecting said inductor to one of said second pair of output terminals to transfer energy stored in said inductor to said second capacitor.

9. A forward converter for converting DC power at a first voltage applied between first and second input terminals to DC power at a second voltage applied to a first pair of output terminals and to a semi-regulated DC voltage at a second pair of output terminals, said forward converter comprising:

a transformer having a primary winding and a secondary winding, said primary winding having first and second leads, said first lead being connected to said first input terminal;

a selectively closing first switch connected between the second lead of said primary winding and said second input terminal, said first switch closing during a portion of each of a plurality of operating cycles;

a rectifier circuit connected to the secondary winding of said transformer, said rectifier circuit rectifying a voltage generated across said secondary winding responsive to opening and closing of said first switch and coupling said rectified voltage to said first pair of output terminals;

a capacitor;

a diode connected in series with said capacitor between the first and second leads of said primary winding so that a charge is transferred to said capacitor each operating cycle having a magnitude that is independent of the magnitude of said first voltage; and a first energy transferring circuit connected to the second lead of said capacitor, said energy transferring circuit receiving a portion of the energy stored in said capacitor during each operating cycle and transferring said energy to said second pair of output terminals.

10. The forward converter of claim 9 wherein said first energy transferring circuit comprises:

an inductor;

a second diode connected between the second lead of said capacitor and said inductor to transfer the energy stored in said capacitor to said inductor each operating cycle;

a second capacitor connected between said second pair of output terminals; and a third diode connected between said inductor and one of said second pair of output terminals to transfer energy stored in said inductor to said second capacitor each operating cycle.

11. A method of generating a semi-regulated DC voltage from reset energy in a forward converter having a transformer with a primary winding connected in series with a selectively closing first switch between a pair of input terminals to which input power is applied so that a reset current is produced by said transformer when said switch opens, said method comprising:

connecting a capacitor in series with a second switch;

connecting the series combination of said capacitor and said second switch between the junction of said first switch and the primary winding of said transformer and a voltage that varies with the voltage of said input voltage;

closing said second switch during at least a portion of the time that said first switch is open so that said reset current charges said capacitor until the voltage across said capacitor reaches a peak value;

opening said second switch after the voltage across said capacitor has reached said peak value; and transferring at least a portion of the reset current stored in said capacitor to output terminals, thereby generating said semi-regulated DC voltage.

12. The method of claim 11 wherein said capacitor is connected to the junction between said first switch and the primary winding of said transformer and wherein said second switch is connected to the voltage that varies with the voltage of said input power.

13. The method of claim 11 wherein said capacitor is connected to the junction between said first switch and the primary winding of said transformer and wherein said second switch is a diode connected to the voltage that varies with the voltage of said input power.

14. The method of claim 11 wherein said first switch is connected between one of said input terminals and one lead of the primary winding of said transformer, wherein another lead of the primary winding of said transformer is connected to the other of said input terminals, wherein said capacitor is connected to the junction between said first switch and the primary winding of said transformer, and wherein said second switch is a diode connected to the junction between the primary winding of said transformer and the other of said input terminals.

* * * * *